(12) United States Patent
Joshi et al.

(10) Patent No.: US 10,740,802 B2
(45) Date of Patent: Aug. 11, 2020

(54) SYSTEMS AND METHODS FOR GAINING KNOWLEDGE ABOUT ASPECTS OF SOCIAL LIFE OF A PERSON USING VISUAL CONTENT ASSOCIATED WITH THAT PERSON

(71) Applicant: FUJI XEROX CO., LTD., Tokyo (JP)

(72) Inventors: Dhiraj Joshi, Fremont, CA (US); Lynn Wilcox, Redwood City, CA (US); Francine Chen, Menlo Park, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 387 days.

(21) Appl. No.: 14/462,511

(22) Filed: Aug. 18, 2014

(65) Prior Publication Data
US 2016/0048887 A1    Feb. 18, 2016

(51) Int. Cl.
*G06Q 30/02*    (2012.01)
*G06K 9/00*    (2006.01)

(52) U.S. Cl.
CPC ..... *G06Q 30/0271* (2013.01); *G06K 9/00677* (2013.01)

(58) Field of Classification Search
CPC .................. G06K 9/6202; G06Q 30/0271
See application file for complete search history.

(56) References Cited

U.S. PATENT DOCUMENTS

| | | | | |
|---|---|---|---|---|
| 8,180,112 B2* | 5/2012 | Kurtz | ................ | G06K 9/00288 382/108 |
| 2005/0111737 A1* | 5/2005 | Das | ....................... | G06F 16/54 382/190 |
| 2011/0135168 A1 | 6/2011 | Hosoi | | |
| 2014/0002342 A1* | 1/2014 | Fedorovskaya | .... | G06Q 30/0271 345/156 |
| 2014/0241616 A1* | 8/2014 | Medvedovsky | ........ | G06K 9/46 382/156 |

OTHER PUBLICATIONS

"Mapping the World's Photos", by Crandall et al. Department of Computer Science, Cornell University. International World Wide Web Conference Committee (IW3C2), Madrid, Spain. WWW 2009, Apr. 20-24, 2009. (Year: 2009).*

(Continued)

*Primary Examiner* — William A Brandenburg
(74) *Attorney, Agent, or Firm* — Procopio, Cory, Hargreaves & Savitch LLP (57) ABSTRACT

Systems and methods to analyze a person's social media photos or videos, such as those posted on Twitter, Facebook, Instagram, etc. and determine properties of their social life. Using information on the number of people appearing in the photos or videos, their ages, and genders, this method can predict whether the person is in a romantic relationship, has a close family, is a group person, or is single. This information is valuable for generating audiovisual content recommendations as well as for advertisers, because it allows targeting personalized advertisements to the person posting the photos. The described methods may be performed (and the advertisements or other content may be selected for recommendation) substantially in real-time as the user accesses a specific online resource.

22 Claims, 5 Drawing Sheets

(56) References Cited

OTHER PUBLICATIONS

"Clever Girl: A Guide to Utilizing Color Histograms for Computer Vision and Image Search Engines", by Adrian Rosebrock. PYImageSearch: You can master Computer Vision, Deep Learning, and OpenCV. Jan. 22, 2014. (Year: 2014).*

Ads Could Soon Know If You're an Introvert (on twitter) http://www.technologyreview.com/news/520671/ads-could-soon-know-if-youre-an-introvert-on-twitter/ visited Aug. 31, 2014.

Chen, Y, et al. "Discovering informative social sub-graphs and predicting pairwise relationships from group photos." Proc. of 20th ACM Int. Conf. on Mult. pp. 669-678 ACM 2012.

Singia, Parag, "Discovery of social relationships in consumer photo collections using Markov logic." Comp. Vision and Pattern Recognition, CVPRW'08, pp. 1-7, IEEE, 2008.

Golbeck, Jennifer, "Predicting personality with social media." In CHI'11 Extended Abstracts on Human Factors in Computing Systems, pp. 253-262. ACM, 2011.

Chen, Huizhong., Gallagher, Andrew., and Girod, Bernd., "What's in a Name: First Names as Facial Attributes", Proc. of IEEE CVPR, 2013.

* cited by examiner

SYSTEMS AND METHODS FOR GAINING KNOWLEDGE ABOUT ASPECTS OF SOCIAL LIFE OF A PERSON USING VISUAL CONTENT ASSOCIATED WITH THAT PERSON

BACKGROUND OF THE INVENTION

Technical Field

The disclosed embodiments relate in general to systems and methods for analyzing visual content and, more specifically, to systems and methods for gaining knowledge about aspects of social life of a person using visual content associated with that person and, optionally, for using this knowledge to recommend content such as video advertisements.

Description of the Related Art

Many dedicated photo- or video-centric social networks have come up lately (e.g. Instagram, Snapchat, Tumblr, and Path). While Twitter started largely as a text based microblogging service, it now supports images and video tweets. Photos truly are worth several words (if not a thousand words) and posting photos, which has become much easier using smartphones, is sometimes advantageous over typing. By looking at the types of faces in photos that people share through their social networks, it is possible to learn certain things about them. For example, if a person's photos are mainly of children and small groups of adults and children, it is likely that this person has a family. If pictures are mainly of large groups of people or roughly the same age, the person is likely a "group person" i.e. someone who enjoys group activities.

However, there are no conventional tools that would leverage the visual content, including photos and videos of a user, publicly available in connection with online social networking resources, to characterize the social life of the associated user. Therefore, new and improved systems and methods are needed that would gain knowledge about aspects of social life of a person using available visual content associated with that person.

SUMMARY OF THE INVENTION

The embodiments described herein are directed to systems and methods that substantially obviate one or more of the above and other problems associated with the conventional technology for learning information about users using available content.

In accordance with one aspect of the embodiments described herein, there is provided a computer-implemented method performed in a computerized system incorporating a processing unit and a memory, the computer-implemented method involving: obtaining a plurality of visual content items associated with a person; using the processing unit to detect one or more human faces in the obtained plurality of visual content items associated with the person; using the processing unit to identify age and gender of the detected one or more human faces in the obtained plurality of visual content items associated with the person; using the processing unit to identify a plurality of feature values based on a number of detected faces in the obtained plurality of visual content items associated with the person; and determining a social type of the person based on the identified plurality of feature values. In the above computer-implemented method, identifying the plurality of feature values involves: categorizing each of the detected one or more human faces into one of a plurality of categories based on the identified age and gender of the detected one or more human faces; assigning each of the plurality of visual content items with the detected one or more human faces to one of a plurality of buckets based on the categories of the one or more human faces; and calculating the feature values for each of the plurality of buckets based on the categories of the detected one or more human faces.

In one or more embodiments, the plurality of feature values form a feature vector for the person and the plurality of feature values are coordinates of the feature vector for the person.

In one or more embodiments, the social type of the person is additionally determined based on additional information about the person, the additional information being obtained from a source other than the visual content items associated with the person.

In one or more embodiments, the plurality of visual content items associated with the person is a plurality of photos and the method further involves discarding those of the plurality of photos that have no detected one or more human faces.

In one or more embodiments, the plurality of visual content items associated with the person is a plurality of videos, each of the plurality of videos having a plurality of video frames and one or more human faces are detected in each of the plurality of video frames.

In one or more embodiments, determining the social type of the person is performed using a machine learning based model for a plurality of different social types.

In one or more embodiments, the plurality of different social types comprises a single person type, a romantic relationship person type, a family person type, and a group person type.

In one or more embodiments, the method further involves selecting a second content item from a second plurality of content items based on the determined social type of the person, the selected second content item being most appropriate to the determined social type of the person.

In one or more embodiments, the second plurality of content items are video advertisements.

In one or more embodiments, the second plurality of content items are videos.

In one or more embodiments, the second plurality of content items are audio recordings.

In accordance with another aspect of the embodiments described herein, there is provided a computer-implemented method performed in a computerized system incorporating a processing unit and a memory, the computer-implemented method involving: obtaining a plurality of visual content items associated with a person; using the processing unit to detect one or more human faces in the obtained plurality of visual content items associated with the person; using the processing unit to identify age and gender of the detected one or more human faces in the obtained plurality of visual content items associated with the person; using the processing unit to identify a plurality of feature values based on a number of detected faces in the obtained plurality of visual content items associated with the person; and selecting a second content item from a second plurality of content items based on the identified plurality of feature values.

In one or more embodiments, the plurality of feature values form a feature vector for the person and the plurality of feature values are coordinates of the feature vector for the person.

In one or more embodiments, identifying the plurality of feature values involves: categorizing each of the detected one or more human faces into one of a plurality of categories based on the identified age and gender of the detected one or more human faces; assigning each of the plurality of visual content items with the detected one or more human faces to one of a plurality of buckets based on the categories of the one or more human faces; and calculating the feature values for each of the plurality of buckets based on the categories of the detected one or more human faces.

In one or more embodiments, the plurality of visual content items associated with the person is a plurality of photos and the method further involves discarding those of the plurality of photos that have no detected one or more human faces.

In one or more embodiments, the plurality of visual content items associated with the person is a plurality of videos, each of the plurality of videos including a plurality of video frames and one or more human faces are detected in each of the plurality of video frames.

In one or more embodiments, the second plurality of content items are video advertisements.

In one or more embodiments, the second plurality of content items are videos.

In one or more embodiments, selecting a second content item from a second plurality of content items involves identifying a second plurality of feature values for each of the second plurality of content items and directly comparing the identified plurality of feature values with the identified second plurality of feature values, where the second content item is selected based on a result of the comparison.

In one or more embodiments, identifying the second plurality of feature values for each of the second plurality of content items involves: detecting one or more second human faces in the second plurality of content items; identifying age and gender of the detected one or more second human faces; and identifying the second plurality of feature values based on a number of detected second human faces in the second plurality of visual content items.

In one or more embodiments, identifying the second plurality of feature values involves: categorizing each of the detected one or more second human faces into one of a plurality of categories based on the identified age and gender of the detected one or more second human faces; assigning each of the second plurality of visual content items with the detected one or more second human faces to one of a plurality of buckets based on the categories of the one or more second human faces; and calculating the second feature values for each of the plurality of buckets based on the categories of the detected one or more second human faces.

In accordance with yet another aspect of the embodiments described herein, there is provided a computerized system incorporating a processing unit and a memory storing a set of instructions, the set of instructions including instructions for: obtaining a plurality of visual content items associated with a person; using the processing unit to detect one or more human faces in the obtained plurality of visual content items associated with the person; using the processing unit to identify age and gender of the detected one or more human faces in the obtained plurality of visual content items associated with the person; using the processing unit to identify a plurality of feature values based on a number of detected faces in the obtained plurality of visual content items associated with the person; and determining a social type of the person based on the identified plurality of feature values.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the embodiments described herein, there is provided a computerized system and a computer-implemented method for gaining knowledge about aspects of social life of a person using available visual content items associated with that person and for using this knowledge to recommend various content, such as video advertisements, music, books or videos. In one or more embodiments, the described system is configured to compute a collective statistics of age(s), gender(s), and nature of group associations using person's social media photographs and use a machine learning approach to map it to the person's social characteristics, which may include, without limitation, information on whether he/she is single, in a romantic relationship, a family person or a group person.

Knowing a person's social life profile, in particular with respect to the four social properties combined with standard profile information such as age and gender, can be very valuable for personalized advertisements delivery. For example, a car company might have different ads for the same car appropriate for different types of people. An advertisement showing a sports car racing through the mountains would be best targeted towards young, single men while the same car shown driving to a luxury hotel might be better targeted toward women. Video advertisements can be directly labeled into the aforementioned categories (for recommendation) or visually analyzed to create property tags. Alternatively, video advertisements with people can also be processed to compute a collective statistic of age(s), gender(s), and nature of group associations represented in them. The framework of the invention can then be used to fetch similar ads (by directly computing feature vector similarity between a person's collection and advertisements).

Figure 1:
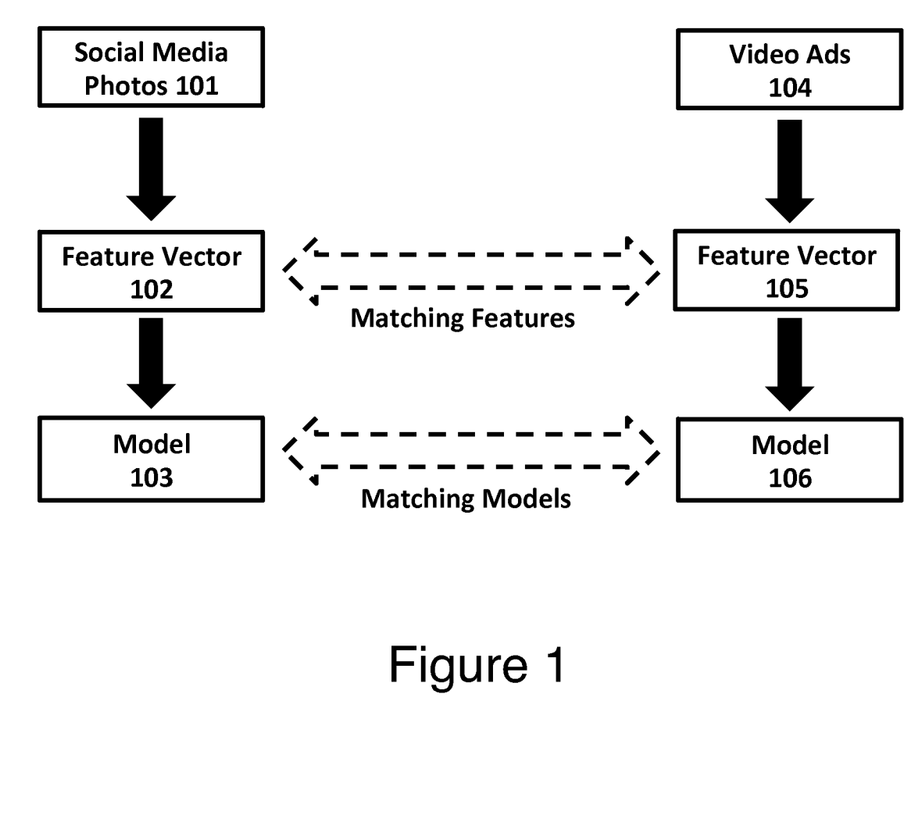
FIG. 1 provides a general overview of an exemplary content matching framework in accordance with various embodiments described herein.

FIG. 1 provides a general overview of an exemplary content matching framework 100 in accordance with various embodiments described herein. As shown in FIG. 1, visual content items, such as social media photos 101 of the user are used to construct user's feature vector 102. The feature vector 102 is used, in turn, to generate the model 103 using, for example, machine learning techniques well known to persons of ordinary skill in the art. Similar processing can be performed with respect to other content, such as video advertisements 104. Specifically, feature vectors 105 and models 106 for each video advertisement are also generated. Direct comparisons may be performed between the feature vectors 102 and 105 or, additionally or alternatively, the models 103 and 106 may be matched to determine the most relevant content for the user. The aforesaid operations will now be described in greater detail.

In one or more embodiments, the described system first obtains person's visual content items, such as photos 101 from a microblog (e.g. Twitter, Instagram, or Tencent Weibo) of other storage location and performs face detection on them. Depending on the type of the aforesaid visual content items, face detection may be performed on separate photos as well as separate frames of video files. In one or more embodiments, face detection is performed using any off-the-shelf face detector, such as the OpenCV face detector well known to persons of ordinary skill in the art. This is followed by age and gender prediction for detected faces. In an embodiment of the invention, face age and gender prediction is performed using the algorithms described in Chen, Huizhong., Gallagher, Andrew., and Girod, Bernd., "What's in a Name: First Names as Facial Attributes", Proc. of IEEE CVPR, 2013 and U.S. Patent Application Publication No. 20110135168.

In one or more embodiments, four properties describing a person's social life (also referred to herein as person's social types) are used: a single person, a person in a romantic relationship, a family person, and a group person. In addition, certain age-gender categories (e.g. categories shown in FIGS. 2(a) and 2(b)) are also defined. In order to represent the nature of group-associations found in pictures, the number of faces is quantized to: single (1 face), pairs (2 faces), small groups (3-6 faces), and large groups (7 or more faces).

Figure 2A:
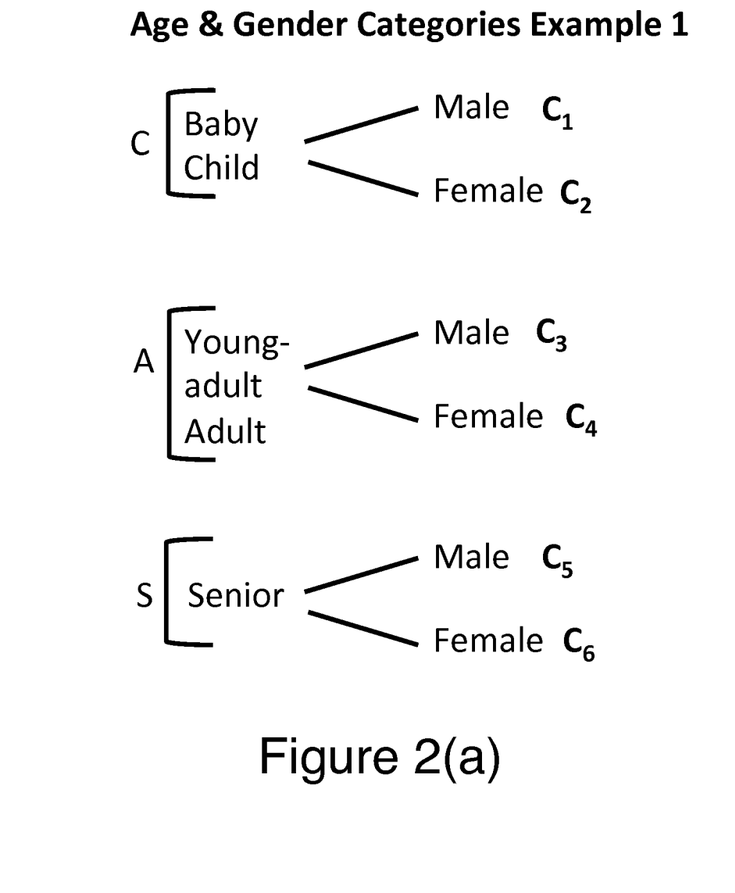
FIGS. 2(a) and 2(b) illustrate certain age-gender categories used in connection with various embodiments described herein.
Figure 2B:
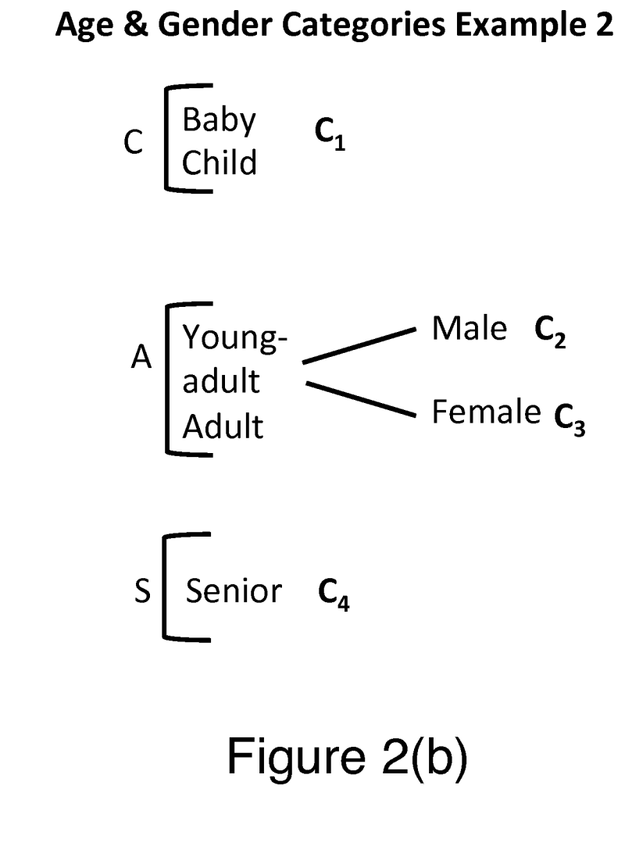

In one or more embodiments, all persons are categorized into one of multiple age-gender categories exemplary embodiments of which are illustrated in FIGS. 2(a) and 2(b). In the first example illustrated in FIG. 2(a), there are three age categories C (baby or child), A (young adult or adult) and S (senior) and six age-gender categories: C1 (male baby or child), C2 (female baby or child), C3 (male young adult or adult), C4 (female young adult or adult), C5 (male senior) and C6 (female senior). In the second example illustrated in FIG. 2(b), there are also three age categories C (baby or child), A (young adult or adult) and S (senior) but only four age-gender categories: C1 (male or female baby or child), C2 (male young adult or adult), C3 (female young adult or adult) and C4 (male or female senior). It should be noted that the described inventive concepts are not limited to the above-enumerated age-gender categories and any other suitable categorization of persons may also be used. Thus, the above exemplary categories should not be construed in a limiting sense.

Figure 3:
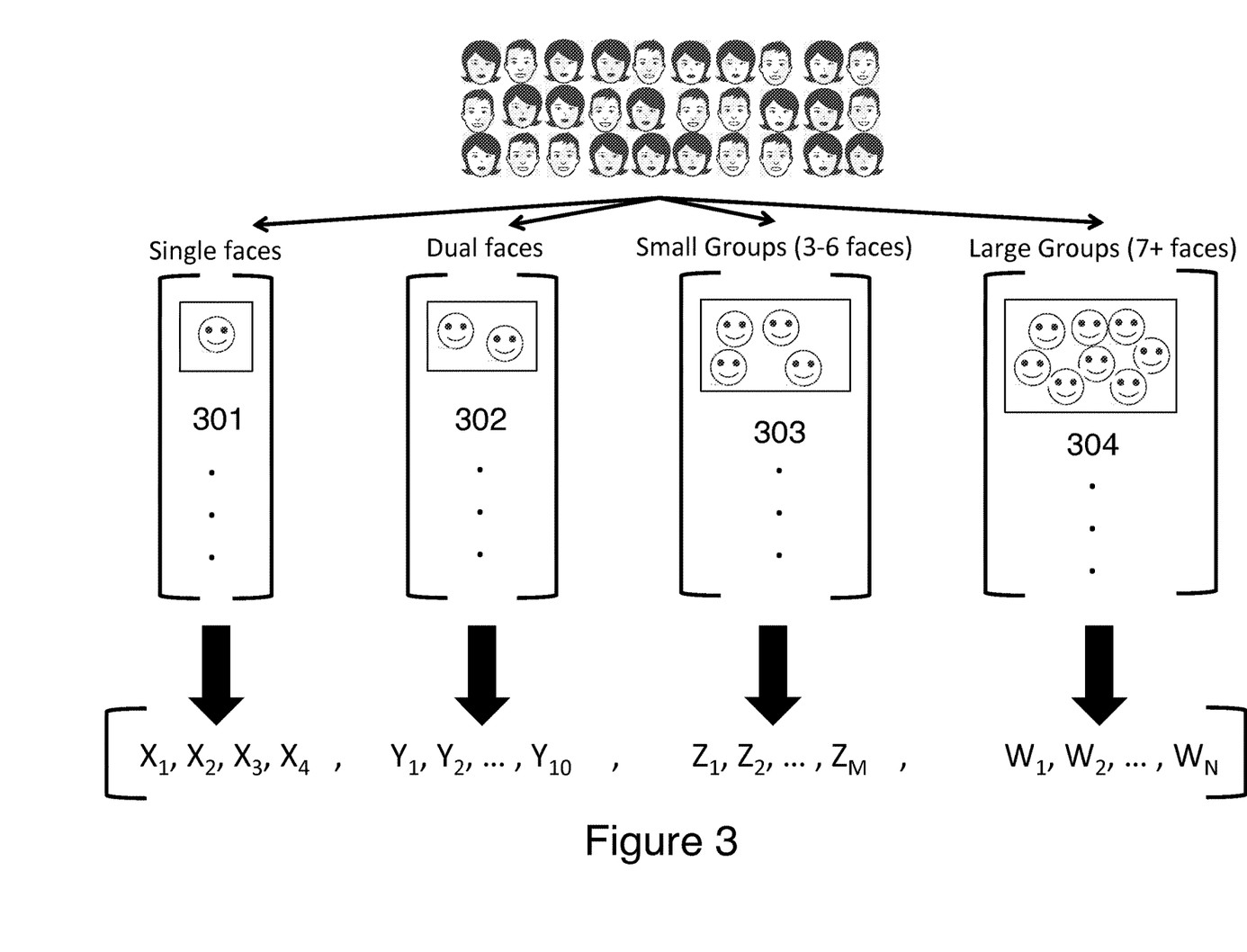
FIG. 3 illustrates four exemplary buckets for categorizing visual content items (photos) of the user and the corresponding feature vector.

In one or more embodiments, the described system is configured to construct a feature vector 102 for a person using his/her social media photo collection 101 in the following manner. Specifically, in one or more embodiments, as illustrated in FIG. 3, the system buckets photos with detected faces into one of the four different buckets: (1) single-face photos 301, (2) photos with pairs of faces 302, (3) photos with small groups (3-6 people) 303, and (4) photos with large groups (7+ people) 304. It should be noted that the described photo buckets 301, 302, 303 and 304 are exemplary only and any other suitable photo classifications could be used in connection with the described embodiments. Thus, the above exemplary photo buckets should not be construed in a limiting sense.

After that, for each of the aforesaid buckets 301-304, the system computes a feature vector representing a collective statistic of age(s), gender(s), and nature of group associations. These features can be concatenated to construct the aggregated feature vector for a person 102. In an embodiment of the invention, feature vector for the single-face bucket 301 can be a histogram $(X1, X2, X3, X4)$ over, for example, the four age-gender categories C1, C2, C3 and C4 shown in FIG. 2(b).

As would be appreciated by persons of ordinary skill in the art, the feature vector for the pairs-faces bucket is more complex to construct as it must consider age-gender associations between the pairs of faces. Given the aforesaid four age-gender categories of faces (e.g. C1, C2, C3, C4 in FIG. 2(b)), the system can construct 10 such associations $(C1^4 + C2^4)$. The feature vector shown as $(Y1, Y2, \ldots, Y10)$ in FIG. 3 is thus a histogram over these 10 group-associations. For the buckets of 3-6 faces groups 303 and 7+ faces groups 304, combinatorially there would be a large number of such association groups. In two embodiments of the invention, one can consider (i) a histogram over the four age-gender categories and thus construct 4 dimensional features $(Z1, Z2, Z3, Z4)$ and $(W1, W2, W3, W4)$ or (ii) associations between pairs of adjacent faces (in photos) to get 10 dimensional features $(Z1, Z2, \ldots, Z10)$ and $(W1, W2, \ldots, W10)$.

In one or more embodiments, a classifier is then constructed to predict the property that best describes a person using the defined feature. In one embodiment, four social properties describing a person's social life are used to classify each person: single, in a romantic relationship, a family person or a group person. Again, the herein-descried social properties are exemplary only and any other suitable social classification of persons may also be used. Within a supervised learning framework, classifiers such as support vector machines (SVM) or decision trees (e.g. CART or random forests) can be learned using a training set of user collections (with humanly labeled social properties).

In an alternative embodiment, the system may be configured to identify the user (rather than combining all photos into one feature vector) treating each photo as a separate exemplar, where each photo is given equal weight. Once a user's face in photos is so identified, the user's social relationships are characterized. In one embodiment, a social graph of faces in a photo is computed and the nearest neighbors are identified. The pairs of relationships between neighbors in the social graph are used to create a feature vector for the photo. The feature vector is composed of: 1) the distribution (e.g. counts) of pairs of age combinations between the user and the nearest neighbors and 2) distribution of pairs of age combinations that don't include the user and 3) the total number of faces in the photo (or some quantized value, e.g., {1, 2, 3, 4-6, 7+}). A set of images labeled with the desired concepts (such as the four social properties as above or additionally concepts such as mother or father) is used to train a classifier for each concept; the face-relationship-based feature vectors serve as input. To label new images, each of the classifiers is run on the image.

In one or more embodiments, a post-processing step is performed that involves grouping all faces in a person's photo collection. Subsequently, the classifier or a Gaussian Mixture Model (GMM), well known to persons of ordinary skill in the art, is run, and a relationship between the user and each person in the photo collection is characterized based on the set of labels assigned from the classifier or the GMM weights.

In one or more embodiments, video advertisements can be associated with property tags in two ways. In one embodiment, the advertisement creators manually tag video advertisements with age, gender, and social life properties. In an alternative embodiment, the video advertisements are analyzed to automatically create corresponding property tags. In one or more embodiments, the system is configured to determine the four social life properties (types) discussed above (single person, person in a romantic relationship, a family person or a group person) in connection with each video advertisement. In one embodiment, this is accomplished by extracting keyframes from the video advertisement and treating them as person's photo collection. The above-described classification procedure can then be used to classify the video advertisement as was done with a person's photos. The result of such classification would be one of the social life properties (types) including a single person, a person in a romantic relationship, a family person or a group person.

In one or more embodiments, keyframes of the video advertisements are extracted in the following manner. First, the video advertisement is sub-sampled to n frames per second (where n could be 1, 2, or any other suitable number). This is accomplished by extracting the best frame from each video segment of a predetermined duration. In one or more embodiments, the best frame is defined as the frame being the least blurry. However, other definitions of the best frame are also possible, which may be used in connection with the embodiments described herein.

Subsequently, face detection is performed on these extracted frames. In one or more embodiments, frames with no detected faces of people are discarded. After that, the frames are clustered using agglomerative clustering based on a calculated distance between frames, which is used to determine which frames or clusters of frames should be combined (for agglomerative). In one or more embodiments, the aforesaid distance between frames is estimated is based on a measure of visual distance.

Finally, a representative keyframe is selected from each resulting cluster based on its similarity to all other frames of the cluster, wherein in this case the distance is based on visual distance as well as the number of people's faces detected in each keyframe. In one embodiment, the visual distance between frames is calculated based on scale-invariant feature transform (SIFT) features well known to persons of ordinary skill in the art. However, in alternative embodiments, other frame distance calculation techniques may be used for this purpose.

In one or more embodiments, the aforesaid SIFT features are first extracted from all frames and used to create a set of visual words for vector quantization. As would be appreciated by persons of ordinary skill in the art, each keyframe is defined by the visual features it contains (bag of visual words). The similarity between frames is computed as the number of visual features they share. After agglomerative clustering, the final keyframe for a cluster is selected by first determining the mode of the people count in all the frames in the cluster and discarding frames where the people count is not equal the determined mode. Among these, the final representative keyframe is selected as the one that shares the most visual words with each other photo in the cluster.

Another exemplary embodiment of a method for video advertisement selection involves selecting keyframes from the video advertisement in the manner described above, but rather than using these selected keyframes to directly classify the advertisements into one of the four social life properties, the method instead compares features of these selected keyframes directly to the features computed using a person's shared photos. Here, the computed features (from the person's social media photos) are used within a retrieval framework to retrieve the most appropriate video advertisements that match a person's age-gender and group dynamics in terms of face content (without the need for explicit classification into the four social property categories). In such a scenario, the set of keyframes (as explained above) with faces can practically be treated like a photo collection and the aforementioned features (representing age-gender and social group content) can be extracted for each advertisement video. For a specific person, an embodiment of the described method obtains advertisements that are most similar in age-gender and group content. For this purpose, a histogram similarity measure such as chi-square distance or K-L divergence, well known to persons of ordinary skill in the art, is used.

In an alternative embodiment, a Gaussian Mixture Model (GMM) is first computed over a large collection of face-relationship-based feature vectors for photos containing faces and then the weights of the GMM are used. The latent states of the GMM correspond to the set of concept labels, and the weights of the GMM indicate how strongly each concept is associated with a user. This information is used to select a video advertisement which best matches the user's social preferences.

Figure 4:
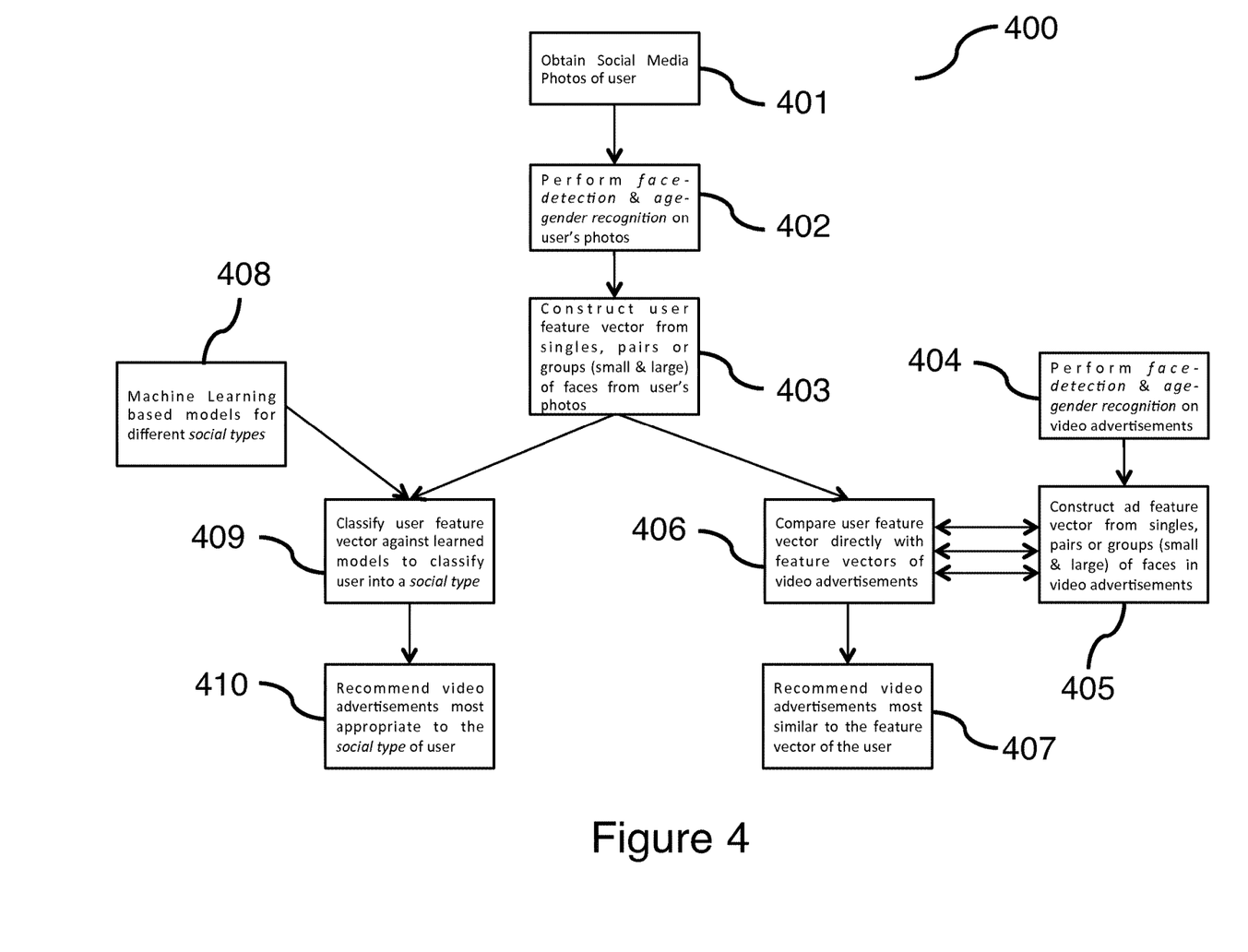
FIG. 4 illustrates an exemplary operating sequence of an embodiment of a method for gaining knowledge about aspects of social life of a person using visual content associated with that person and for using this knowledge to recommend content such as video advertisements.

FIG. 4 illustrates an exemplary operating sequence 400 of an embodiment of a method for gaining knowledge about aspects of social life of a person using visual content associated with that person and for using this knowledge to recommend content such as video advertisements. The operating sequence 400 incorporates the different processing steps discussed above including the approaches wherein (i) the user feature is classified against models constructed using machine learning approach; and (ii) the user feature is directly compared with features extracted from video advertisements.

First, at step 401, social media photos or other visual content of the user are obtained. In various embodiments, the visual content may be downloaded from user's pages on various online social networking resources. In an alternative embodiment, a search engine may be used to locate and download the content. Subsequently, at step 402, human face detection as well as age and gender recognition on the detected human faces is performed using the obtained visual content of the user. At step 403, a user feature vector is constructed based on numbers of items of visual content (e.g. photos) in user's collection with predetermined numbers of detected human faces (photo buckets). As stated above, in one embodiment, the following are possible photo buckets for computing the user feature vector coordinates: single (1 face), pairs (2 faces), small groups (3-6 faces), and large groups (7 or more faces).

Subsequently, the user feature vector constructed in the manner described above is used to recommend video advertisement most suitable to the aspects of social life of the user. The following steps 408-410 are specific to the aforesaid machine learning approach to video advertisement selection, while steps 404-407 implement the aforesaid direct comparison approach.

In accordance with the direct comparison approach, at step 404, face detection as well as age and gender recognition are performed on a set of video advertisements. At step 405, an advertisement feature vector is constructed for each video advertisement based on the detected human faces assigned to predetermined photo buckets as described above. As stated above, in one embodiment, the following are possible photo buckets for computing the advertisement feature vector coordinates: single (1 face), pairs (2 faces), small groups (3-6 faces), and large groups (7 or more faces).

At step 406, the user feature vector is directly compared with the video advertisement feature vectors using a predetermined metric. A variety of comparison metrics may be used for comparing the aforesaid feature vectors. Therefore, the concepts described herein are not limited to any particular feature vector comparison metric. Finally, at step 407, the system is configured to select a video advertisement having a feature vector that is most similar to the feature vector of the user. This selected video advertisement is then recommended as the one that best matches user's social preferences.

On the other hand, in accordance with the aforesaid machine learning approach, at step 408, machine-learning based models for different social types of persons are constructed, stored or otherwise obtained. At step 409, the user feature vector constructed at step 403 is classified against learned models to classify the user into one of social types. As stated above, exemplary social types of users include a single person, a person in a romantic relationship, a family person or a group person. Finally, at step 410, a video advertisement is recommended that is most appropriate for the determined social type of the user.

It should be noted that the inventive concepts described above are not limited to selecting video advertisements. Various embodiments described herein may be used for providing various content recommendations based on user's determined feature vector. Exemplary recommended content may include textual material, such as books, as well as audiovisual content, including music and videos. To this end, the system may use either the described machine learning approach or the described feature vector direct comparison approach. In one or more embodiments, in addition to the user feature vector calculated using the visual content associated with the user, the information about the demographics of the user, including, without limitation, gender, age, ethnicity, knowledge of languages, disabilities, mobility, income, home ownership, employment status, and/or location, obtained directly from the social network or other online resources may be additionally used for content recommendation. It should be further noted that the methods described herein may be performed (and the advertisements or other content may be selected for recommendation) substantially in real-time as the user accesses a specific online resource.

Figure 5:
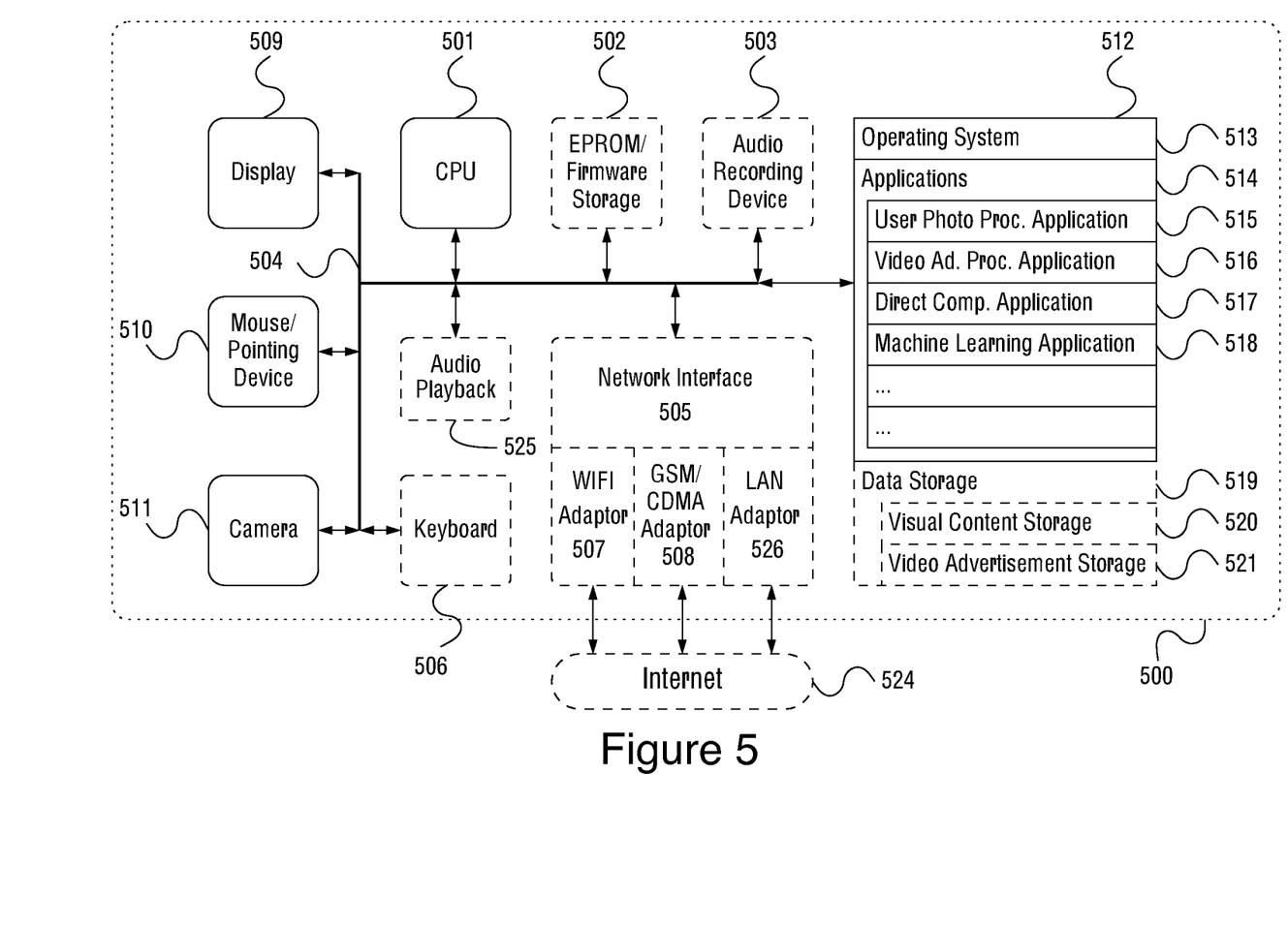
FIG. 5 illustrates an exemplary embodiment of a computerized system for gaining knowledge about aspects of social life of a person using visual content associated with that person and for using this knowledge to recommend content, such as video advertisements.

FIG. 5 illustrates an exemplary embodiment of a computerized system 500 for gaining knowledge about aspects of social life of a person using visual content associated with that person and for using this knowledge to recommend content, such as video advertisements. In one or more embodiments, the computerized system 500 may be implemented within the form factor of a desktop computer or a server well known to persons of skill in the art. In an alternative embodiment, the computerized system 500 may be implemented based on a laptop computer, a notebook computer, a tablet computer, a smartphone or other mobile computing device.

The computerized system 500 may include a data bus 504 or other interconnect or communication mechanism for communicating information across and among various hardware components of the computerized system 500, and a central processing unit (CPU or simply processor) 501 electrically coupled with the data bus 504 for processing information and performing other computational and control tasks. Computerized system 500 also includes a memory 512, such as a random access memory (RAM) or other dynamic storage device, coupled to the data bus 504 for storing various information as well as instructions to be executed by the processor 501. The memory 512 may also include persistent storage devices, such as a magnetic disk, optical disk, solid-state flash memory device or other non-volatile solid-state storage devices.

In one or more embodiments, the memory 512 may also be used for storing temporary variables or other intermediate information during execution of instructions by the processor 501. Optionally, the computerized system 500 may further include a read only memory (ROM or EPROM) 502 or other static storage device coupled to the data bus 504 for storing static information and instructions for the processor 501, such as firmware necessary for the operation of the computerized system 500, basic input-output system (BIOS), as well as various configuration parameters of the computerized system 500.

In one or more embodiments, the computerized system 500 may incorporate a display device 509, which may be also electrically coupled to the data bus 504, for displaying various information to a user of the computerized system 500. In an alternative embodiment, the display device 509 may be associated with a graphics controller and/or graphics processor (not shown). The display device 509 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 509 may be incorporated into the same general enclosure with the remaining components of the computerized system 500. In an alternative embodiment, the display device 509 may be positioned outside of such enclosure, such as on the surface of a table or a desk.

In one or more embodiments, the computerized system 500 may further incorporate an audio playback device 525 electrically connected to the data bus 504 and configured to play various audio files, such as MPEG-3 files, or audio tracks of various video files, such as MPEG-4 files, well known to persons of ordinary skill in the art. To this end, the computerized system 500 may also incorporate waive or sound processor or a similar device (not shown).

In one or more embodiments, the computerized system 500 may incorporate one or more input devices, such as a mouse/pointing device 510, such as a mouse, a trackball, a touchpad, or cursor direction keys for communicating direction information and command selections to the processor 501 and for controlling cursor movement on the display 509. This input device typically has two degrees of freedom in two axes, a first axis (e.g., x) and a second axis (e.g., y), that allows the device to specify positions in a plane.

The computerized system 500 may further incorporate a camera 511 for acquiring still images and video of various objects, as well as a keyboard 506, which all may be coupled to the data bus 504 for communicating information, including, without limitation, images and video, as well as user commands to the processor 501. Additionally provided may be an audio recording device 503 for recording an audio track accompanying the video recorded by the camera 511.

In one or more embodiments, the computerized system 500 may additionally include a communication interface, such as a network interface 505 coupled to the data bus 504. The network interface 505 may be configured to establish a connection between the computerized system 500 and the Internet 524 using at least one of a WIFI interface 507, a cellular network (GSM or CDMA) adaptor 508 and/or local area network (LAN) adaptor 526. The network interface 505 may be configured to enable a two-way data communication between the computerized system 500 and the Internet 524. The WIFI adaptor 507 may operate in compliance with 802.11a, 802.11b, 802.11g and/or 802.11n protocols as well as Bluetooth protocol well known to persons of ordinary skill in the art. The LAN adaptor 526 of the computerized system 500 may be implemented, for example, using an integrated services digital network (ISDN) card or a modem to provide a data communication connection to a corresponding type of telephone line, which is interfaced with the Internet 524 using Internet service provider's hardware (not shown). As another example, the LAN adaptor 526 may be a local area network interface card (LAN NIC) to provide a data communication connection to a compatible LAN and the Internet 524. In an exemplary implementation, the WIFI adaptor 507, the cellular network (GSM or CDMA) adaptor 508 and/or the LAN adaptor 526 send and receive electrical or electromagnetic signals that carry digital data streams representing various types of information.

In one or more embodiments, the Internet 524 typically provides data communication through one or more sub-networks to other network resources. Thus, the computerized system 500 is capable of accessing a variety of network resources located anywhere on the Internet 524, such as remote media servers, web servers, other content servers as well as other network data storage resources. In one or more embodiments, the computerized system 500 is configured to send and receive messages, media and other data, including application program code, through a variety of network(s) including the Internet 524 by means of the network interface 505. In the Internet example, when the computerized system 500 acts as a network client, it may request code or data for an application program executing on the computerized system 500. Similarly, it may send various data or computer code to other network resources.

In one or more embodiments, the functionality described herein is implemented by computerized system 500 in response to processor 501 executing one or more sequences of one or more instructions contained in the memory 512. Such instructions may be read into the memory 512 from another computer-readable medium. Execution of the sequences of instructions contained in the memory 512 causes the processor 501 to perform the various process steps described herein. In alternative embodiments, hard-wired circuitry may be used in place of or in combination with software instructions to implement the embodiments of the invention. Thus, the described embodiments of the invention are not limited to any specific combination of hardware circuitry and/or software.

The term "computer-readable medium" as used herein refers to any medium that participates in providing instructions to the processor 501 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to the processor 501 for execution. For example, the instructions may initially be carried on a magnetic disk from a remote computer. Alternatively, a remote computer can load the instructions into its dynamic memory and send the instructions over the Internet 524. Specifically, the computer instructions may be downloaded into the memory 512 of the computerized system 500 from the foresaid remote computer via the Internet 524 using a variety of network data communication protocols well known in the art.

In one or more embodiments, the memory 512 of the computerized system 500 may store any of the following software programs, applications or modules:

1. An operating system (OS) 513 for implementing basic system services and managing various hardware components of the computerized system 500. Exemplary embodiments of the operating system 513 are well known to persons of skill in the art, and may include any now known or later developed mobile operating systems.

2. Applications 514 may include, for example, a set of software applications executed by the processor 501 of the computerized system 500, which cause the computerized system 500 to perform certain predetermined functions, such as display user interface(s) on the display device 509 or record a video using the camera 511. In one or more embodiments, the applications 514 may include a user photos processing application 515 for performing face detection as well as age and gender recognition in user's photos and for constructing the corresponding user feature vector. In addition, a video advertisement processing application 516 may be provided for performing face detection as well as age and gender recognition in video advertisements and for constructing the corresponding user feature vector. Direct comparison application 517 may be provided for comparing the user feature vector generated by the user photos processing application 515 with the advertisement feature vector constructed by the advertisement processing application 516 and for recommending best advertisement for the user. On the other hand, a machine learning application 518 may be provided to generate video advertisement recommendations based on the user feature vector generated by the user photos processing application 515 using the machine learning techniques described above.

3. A data storage 519 may include, for example, a visual content storage 520 for storing visual content (e.g. photos or videos) associated with users as well as a video advertisement storage 521 for storing video advertisements or other content for recommendation.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for gaining knowledge about aspects of social life of a person using visual content associated with that person and for using this knowledge to recommend content such as video advertisements. It is intended that the specification and examples be considered as exemplary only, with a true scope and spirit of the invention being indicated by the following claims.

What is claimed is:

1. A computer-implemented method performed in a computerized system comprising a processing unit and a memory, the computer-implemented method comprising:
   a. obtaining a plurality of visual content items associated with a person;
   b. using the processing unit to detect one or more human faces in the obtained plurality of visual content items associated with the person;
   c. using the processing unit to identify age and gender of the detected one or more human faces in the obtained plurality of visual content items associated with the person;
   d. using the processing unit to identify a plurality of feature values based on a number of detected faces in the obtained plurality of visual content items associated with the person, wherein identifying the plurality of feature values comprises:
      i. categorizing each of the detected one or more human faces into one of a plurality of categories based on both the identified age and gender of the detected one or more human faces, wherein each of the plurality of categories is simultaneously characterized by both a category age and a category gender;
      ii. assigning each of the plurality of visual content items with the detected one or more human faces to one of a plurality of buckets based on a number of the detected human faces in the each of the plurality of visual content items, wherein each of the plurality of buckets is characterized by a face count in each content item in the bucket; and
      iii. calculating the feature values for each of the plurality of buckets based on the categories of the detected one or more human faces, wherein the feature values represent a collective statistic of ages, genders, and a nature of age-gender associations between the different faces in the each of the plurality of buckets; and
   e. determining a social type of the person based on the identified plurality of feature values.

2. The computer-implemented method of claim 1, wherein the plurality of feature values form a feature vector for the person and wherein the plurality of feature values are coordinates of the feature vector for the person.

3. The computer-implemented method of claim 1, wherein the social type of the person is additionally determined based on additional information about the person, the additional information being obtained from a source other than the visual content items associated with the person.

4. The computer-implemented method of claim 1, wherein the plurality of visual content items associated with the person is a plurality of photos and wherein the method further comprises discarding those of the plurality of photos that have no detected one or more human faces.

5. The computer-implemented method of claim 1, wherein the plurality of visual content items associated with the person is a plurality of videos, each of the plurality of videos comprising a plurality of video frames and wherein one or more human faces are detected in at least one of the plurality of video frames.

6. The computer-implemented method of claim 1, wherein determining the social type of the person is performed using a machine learning based model for a plurality of different social types.

7. The computer-implemented method of claim 6, wherein the plurality of different social types comprises a single person type, a romantic relationship person type, a family person type, and a group person type.

8. The computer-implemented method of claim 1, further comprising selecting a second content item from a second plurality of content items based on the determined social type of the person, the selected second content item being most appropriate to the determined social type of the person.

9. The computer-implemented method of claim 8, wherein the second plurality of content items are video advertisements.

10. The computer-implemented method of claim 8, wherein the second plurality of content items are videos.

11. The computer-implemented method of claim 8, wherein the second plurality of content items are audio recordings.

12. A computer-implemented method performed in a computerized system comprising a processing unit and a memory, the computer-implemented method comprising:
   a. obtaining a plurality of visual content items associated with a person;
   b. using the processing unit to detect one or more human faces in the obtained plurality of visual content items associated with the person;

c. using the processing unit to identify both age and gender of the detected one or more human faces in the obtained plurality of visual content items associated with the person;

d. counting a total number of detected faces in each the obtained plurality of visual content items associated with the person;

e. using the processing unit to identify a plurality of feature values based on the counted total number of detected faces in the obtained plurality of visual content items associated with the person, wherein the feature values represent a collective statistic of ages, genders, and a nature of age-gender associations between the detected faces; and f. selecting a second content item from a second plurality of content items based on the identified plurality of feature values.

13. The computer-implemented method of claim 12, wherein the plurality of feature values form a feature vector for the person and wherein the plurality of feature values are coordinates of the feature vector for the person.

14. The computer-implemented method of claim 12, wherein identifying the plurality of feature values comprises:

i. categorizing each of the detected one or more human faces into one of a plurality of categories based on the identified age and gender of the detected one or more human faces;

ii. assigning each of the plurality of visual content items with the detected one or more human faces to one of a plurality of buckets based on the categories of the one or more human faces; and iii. calculating the feature values for each of the plurality of buckets based on the categories of the detected one or more human faces.

15. The computer-implemented method of claim 12, wherein the plurality of visual content items associated with the person is a plurality of photos and wherein the method further comprises discarding those of the plurality of photos that have no detected one or more human faces.

16. The computer-implemented method of claim 12, wherein the plurality of visual content items associated with the person is a plurality of videos, each of the plurality of videos comprising a plurality of video frames and wherein one or more human faces are detected in at least one of the plurality of video frames.

17. The computer-implemented method of claim 12, wherein the second plurality of content items are video advertisements.

18. The computer-implemented method of claim 12, wherein the second plurality of content items are videos.

19. The computer-implemented method of claim 12, wherein selecting a second content item from a second plurality of content items comprises identifying a second plurality of feature values for each of the second plurality of content items and directly comparing the identified plurality of feature values with the identified second plurality of feature values and wherein the second content item is selected based on a result of the comparison.

20. The computer-implemented method of claim 19, wherein identifying the second plurality of feature values for each of the second plurality of content items comprises:

i. detecting one or more second human faces in the second plurality of content items;

ii. identifying age and gender of the detected one or more second human faces; and iii. identifying the second plurality of feature values based on a number of detected second human faces in the second plurality of visual content items.

21. The computer-implemented method of claim 20, wherein identifying the second plurality of feature values comprises:

i. categorizing each of the detected one or more second human faces into one of a plurality of categories based on the identified age and gender of the detected one or more second human faces;

ii. assigning each of the second plurality of visual content items with the detected one or more second human faces to one of a plurality of buckets based on the categories of the one or more second human faces; and iii. calculating the second feature, values for each of the plurality of buckets based on the categories of the detected one or more second human faces.

22. A computerized system comprising a processing unit and a memory storing a set of instructions, the set of instructions comprising instructions for:

a. obtaining a plurality of visual content items associated with a person;

b. using the processing unit to detect one or more human faces in the obtained plurality of visual content items associated with the person;

c. using the processing unit to identify both age and gender of the detected one or more human faces in the obtained plurality of visual content items associated with the person;

d. counting a total number of detected faces in each the obtained plurality of visual content items associated with the person;

e. using the processing unit to identify a plurality of feature values based on the counted total number of detected faces in the obtained plurality of visual content items associated with the person, wherein the feature values represent a collective statistic of ages, genders, and a nature of age-gender associations between the different faces; and f. determining a social type of the person based on the identified plurality of feature values.

* * * * *